INVENTOR.
LAWRENCE C. LYNNWORTH

Nov. 11, 1969  L. C. LYNNWORTH  3,477,278
ULTRASONIC MEASUREMENT

Filed Dec. 23, 1966  2 Sheets-Sheet 2

INVENTOR.
LAWRENCE C. LYNNWORTH
BY
Weingarten, Arenbuch & Lahive
ATTORNEYS

United States Patent Office 3,477,278
Patented Nov. 11, 1969

3,477,278
ULTRASONIC MEASUREMENT
Lawrence C. Lynnworth, Waltham, Mass., assignor to Parametrics, Inc., Waltham, Mass., a corporation of Massachusetts
Filed Dec. 23, 1966, Ser. No. 604,357
Int. Cl. G01n 11/10
U.S. Cl. 73—53
10 Claims

ABSTRACT OF THE DISCLOSURE

There is described a system for measuring the ultrasonic longitudinal wave transmission characteristics of a solid, fluid, or solids immersed in said fluid, where the environment at the medium requires that the wave generating crystal be removed some distance from it. The system employs a long probe having a shear wave crystal bonded to one end and having its other end bevelled so that shear waves transmitted normal to the face of the crystal are mode converted into longitudinal waves at the bevelled surface. The longitudinal waves are then emitted into the test fluid from the side of the probe adjacent to the bevelled surface. Internal reflections are suppressed either by choice of a critical bevel angle or by the use of a filter within the probe. The filter is formed of a material having an acoustic characteristic impedance widely different from that of the probe matetrial.

---

This invention relates in general to ultrasonic measurement and more particularly to a method and apparatus for determining the longitudinal wave transmission characteristics of solid or fluid materials, or solid materials immersed in fluids.

Non-destructive testing techniques have been found to be extremely useful both in analyzing materials for internal characteristics and for determining the characteristics of a process material while the process is still going on. Non-destructive testing techniques include X-ray diffraction methods, neutron radiography, optical and electrical techniques and ultrasonic measurements, the latter being of special interest as ultrasonic wave velocity and wave attenuation measurements can simultaneously yield information on several qualities of the material being tested since the transmission of ultrasonic waves through a material depends upon several factors. Among these factors are the temperature of the material, the grain size, the moduli of elasticity and the continuity of the material itself, that is, the presence of voids or flaws. There are a number of situations in which characteristics of a fluid are to be measured. Thus quantities such as flow velocity, turbulence, viscosity, degree of mixing, etc., may be determined by the ultrasonic measurements. There are also cases where it is necessary to test solids which are partly or wholly immersed in a fluid.

Since fluids will not support shear waves to any substantial extent, longitudinal waves are preferably employed in transmitting through fluids. In a number of fluid measurement problems severe environmental conditions are encountered. These include extreme temperatures and corrosive or otherwise toxic atmospheres. Most ultrasonic transducers cannot be maintained operative when exposed to this type of environment.

When the hostile nature of the material being processed requires that the ultrasonic transducers be isolated from direct contact with the material, then a length of buffer rod between the transducer and the material may be used. In the usual case the diameter of a pieoelectric crystal transducer is equal to several wave lengths of the ultrasonic energy. The buffer rod is usually several diameters long in order to effectively isolate the crystal from the fluid. Under these circumstances longitudinal waves transmitted along the buffer rod produce spurious internal reflections due to mode conversions at the sides of the buffer rod. These multiple reflections are readily confused with the original signal, making accurate ultrasonic measurements difficult, impractical or impossible.

It is therefore the primary object of the present invention to provide a method and apparatus for measuring the transmission characteristics of ultrasonic longitudinal waves in a fluid, particularly in a hostile environment.

It is another object of the invention to provide an ultrasonic measuring apparatus particularly suited for high temperature measurements and including a probe for transmitting longitudinal waves to a material in process.

It is yet another object of the present invention to provide an apparatus for measuring the ultrasonic longitudinal wave trasmitting characteristics of a material which affords the advantages of a shear wave probe and avoids the disadvantages of a longitudinal wave probe.

Briefly, the present invention provides a system for obtaining data on the properties of a test material by means of ultrasonic longitudinal waves passed through the test material. The system includes a transmitter-probe combination having an ultrasonic shear wave transducer and an associated long, thin buffer rod designed to conduct the shear waves produced by the transducer at one end of the rod towards the other rod end. The other end of the rod is shaped to mode convert by reflection the shear waves into ultrasonic longitudinal waves for passage through the test material. The present system may include only one long thin probe for pulse echo measurements; however, in the case of transmission measurements a second receiver-probe combination including an ultrasonic shear wave transducer and an associated long, thin buffer rod is employed. More particularly, the first mentioned buffer rod is several (about eight to ten) wave lengths long and is characterized by an inclined, bevelled or chamfered end for converting, by means of an internal reflection process, the shear waves passing through the buffer rod into longitudinal waves for introduction into the test material. Similarly, the second mentioned buffer rod is of substantially the same length and is also characterized by a bevelled or chamfered end for converting, by means of an internal reflection process, the longitudinal waves received from the test material into shear waves for passage through the buffer rod. The buffer rod material and the angle of the bevel may be selected so that the direction of propagation of the longitudinal waves through the test material will be perpendicular to the direction of propagation of the shear waves through the buffer rods. For buffer rods not so selected, the angle between the directions of propation can be controlled and made to vary only a minor degree from perpendicularity.

The use of a probe which includes a shear wave generating transducer, and a long thin buffer rod with a beveled reflection surface for converting the generated shear waves into reflected longitudinal waves overcomes those difficulties encountered when longitudinal waves are initially generated and then transmitted down a long thin probe. The principal advantage achieved is a decrease in the multiple pulses generated by undesired internal reflections and mode conversions in the probe; a secondary advantage is the longer delay, and hence a clearer separation, between the "main bang" or electrical transmitting pulse and the resultant signals and echoes. The latter advantage results from the lower propagation rate of shear waves relative to longitudinal waves. Yet another important advantage of a shear wave probe is that less beam spread is encountered for a given transducer size and particular test frequency.

Other objects and advantages will become apparent from the following description when taken in conjunction with the accompanying drawing in which.

Figure 1:
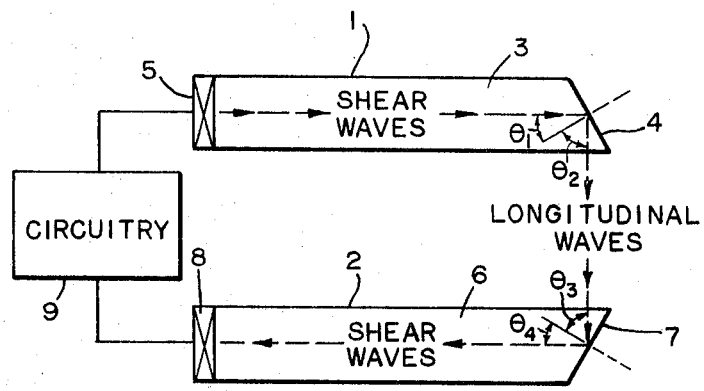
FIG. 1 is an illustration in diagrammatic form of an ultrasonic measuring system constructed in accordance with the principles of this invention.

Referring now to the drawing and particularly to FIG. 1, there is illustrated an ultrasonic measuring apparatus consisting of a long thin probe 1 for transmiting ultrasonic longitudinal waves through a material to be analyzed and a second long thin probe 2 for receiving transmitted ultrasonic longitudinal waves from the material. In the system of FIG. 1, probe 1 consists of a piezoelectric crystal 5 bonded to one end of a generally cylindrical solid rod 3 which has its other end bevelled to form a vertically inclined surface 4. Suitable conventional circuitry 9 is connected to crystal 5 to both excite the transmitting crystal for generation of ultrasonic waves and for detecting electrical signals produced by shear waves incident on the receiving crystal 8 or incident on the transmitting/receiving crystal 5 in pulse echo operation. The piezoelectric crystal 5 is a shear wave emitting crystal, that is, it is formed so that it emits shear waves in a direction normal to its face when excited by appropriate electrical signals. Typically, the crystal diameter is about equal in dimension to at least three wave lengths of the emitted ultrasonic waves and, in this instance, buffer rod 3 has a length which exceeds three times the crystal diameter. In operation, shear waves vibrating in the vertical direction are generated by excitation of the piezoelectric crystal 5 and are transmitted along the longitudinal axis of the buffer rod 3. These waves are reflected from the bevelled surface 4 to emerge as longitudinal waves from the probe 1 in a direction normal to the longitudinal axis of the probe 1. The conversion of the generated shear waves into emitted longitudinal waves take place at the bevelled surface 4. In the remainder of this description the term shear waves will be used to denote waves vibrating vertically, i.e., the transverse wave vibration is in the plane of incidence (SV type). The plane of the bevelled surface 4 has an angle of inclination with respect to the longitudinal axis of the buffer rod, but remains perpendicular to the plane defined by the longitudinal axis of the contact element and the polarization vector of the ultrasonic vibrations.

There are a number of factors which control the efficiency of the conversion and the direction of propagation of the resultant longitudinal waves. The determination of the efficiency of mode conversion is explained in an article by D. Arenberg appearing in the Journal of the Acoustical Society of America, volume 20, Number 1, January 1948 on pages 1 through 26. Table 1 shows the included angle (rounded off to nearest degree) between the incident and reflected beam for complete transfer of modes, as a function of Poisson's ratio $\sigma$. When the value of Poisson's ratio is less than 0.26, there are two angles of incidence at which there is a complete transfer and at $\sigma = 0.26$ there is one. The included angle is the sum of the angle of incidence and the angle of emergence, i.e., $(\theta_3 + \theta_4)$. For $\sigma$ less than 0.26, there are two different included angles for complete transfer.

Generally, however, the smaller of the two included angles is preferred in a practical probe design, because at the larger angle, the efficiency of mode conversion, while theoretically 100%, is actually very sensitive to small uncertainties in or small errors in the angles of incidence $\theta_1$ or $\theta_3$. In addition to the efficiency of conversion, the direction of propagation of the mode converted waves is an important design consideration. As shown below for $\sigma = 0.25$, a choice of $\theta_1 = 30°$ and $\theta_3 = 60°$ (total, 90°) leads to simpler probe construction and simpler pulse echo testing than the equally efficient (with respect to mode conversion) alternative of $\theta_1 = 34.16°$ and $\theta_3 = 77.16°$ (total, $\approx 111°$).

TABLE I

| Poisson's ratio | Included angle between incident and reflected beam for complete transfer of modes, degrees | |
|---|---|---|
| 0.00 | 04 | 135 |
| 0.14 | 72 | 128 |
| 0.16 | 74 | 126 |
| 0.19 | 76 | 124 |
| 0.22 | 83 | 119 |
| 0.25 | 90 | 111 |
| 0.26 | 97 | |

In order then for the conversion to be 100%, the material must exhibit a Poisson's ratio, $\sigma$, less than or essentially equal to 0.26. Many materials characterized by $\sigma \lesssim 0.26$ are particularly suitable for use at high temperature or in corrosive atmospheres. Such materials include, for example, fused silica, alumina, beryllium, beryllia, and a number of tungsten carbide formulations. When $\sigma$ is equal to 0.26, 100% mode conversion occurs at $\theta_1 = 32°$. For $\sigma$ greater than 0.26 there is no value of $\theta_1$ at which there is 100% mode conversion. Nevertheless, useful configurations can still be fabricated, even with $\sigma > 0.26$, as described later on in this specification.

When the system of FIG. 1 is used in the through transmission mode, the receiving probe 2 is similar in construction to the transmitting probe 1. A long thin buffer rod 6 has at one end a bevelled edge or chamber 7 and at the other end is mounted a piezoelectric crystal 8 which will, when excited by appropriate ultrasonic shear waves, emit electrical energy. In this mode the circuit 9 is also connected to crystal 8. The longitudinal waves entering the buffer rod 6 from the test material end have an angle of incidence $\theta_3$ with respect to the normal to the bevel 7, and the shear waves generated by the mode conversion at bevel 7 are emitted at an angle $\theta_4$ back along the buffer rod.

In order for the probe illustrated in FIG. 1 to be useful in the pulse echo mode, the included angle between the incident and the reflected beam (equal to $\theta_1 + \theta_2$) must equal 90°, since only then will returning longitudinal waves be converted into shear waves directed back toward the crystal 5. The sum of these angles equals 90° only when $\sigma = 0.25$. When $\sigma = 0.25$, a value of $\theta_1$ equal to 30° provides both a 100% mode conversion and an angle of emergency, $\theta_2$, of 60°. For such a material, then, the probe 1 illustrated in FIG. 1 provides 100% conversion efficiency and emits the converted longitudinal radiation along an axis of propagation perpendicular to the axis of propagation of the shear waves down the rod 3.

In through transmission testing, when $\theta_3$ and the material of the rod have been selected to produce mode conversion with $\theta_3 + \theta_4 = 90°$, (i.e., $\sigma = 0.25$, $\theta_3 = 60°$, $\theta_4 = 30°$), the axis of propagation of the reflected shear waves is perpendicular to the axis of propagation of the incident longitudinal waves. The shear waves created by internal reflection at the bevel 7 are thus propagated along an axis parallel to the longitudinal axis of the buffer rod 6 until they are received by shear wave crystal 8 at the other end of buffer rod 6. The shear wave crystal 8 acts as a transducer to convert the received shear waves into electrical impulses which may be detected by any of the conventional means well known in the art.

To summarize the operation of the system shown in FIG. 1, an electrically actuated transducer 5 produces shear waves which are propagated along a buffer rod 3 and mode converted at beveled surface 4 into longitudinal waves for passage through a material to be tested. This material may be completely solid, or a solid immersed in a fluid, or a fluid itself. The longitudinal waves passing through the test material and entering the buffer rod 6 are mode converted into shear waves at bevelled surface 7 and then are propagated along the longitudinal axis of buffer rod 6 to a shear wave actuated transducer 8.

Because the ultrasonic waves passing through the test material are longitudinal waves, fluid as well as solid materials may be tested. The transmitting and receiving probes may be used in either pulse echo or through transmittal modes with single or differential paths and with fixed or variable paths. For example, through transmission measurements using a fixed differential path may be achieved using a single transmitter and two receiving probes, each of the receiving probes being separated from the transmitter by a different path length through the test material. Because the shear wave is not mode converted within the probes, except at the ends, there is a greater separation between the various pulses then would be the case if longitudinal wave crystals were used in the system. Furthermore, also because of the slower propagation speed of shear waves relative to longitudinal waves, a longer delay and therefore a clearer separation will exist between the main pulsed ultrasonic energy and the received signals, thereby simplifying the task of analyzing the test results.

Figure 2:
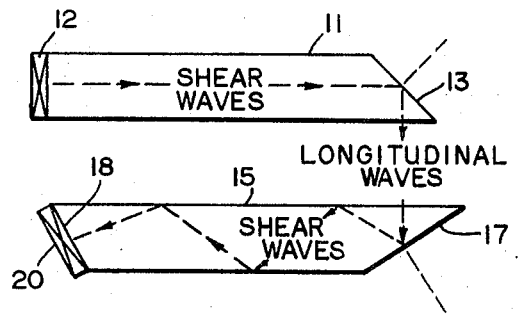
FIG. 2 is an illustration in diagrammatic form of a second embodiment of an ultrasonic measuring system constructed in accordance with the principles of this invention.
Figure 3:
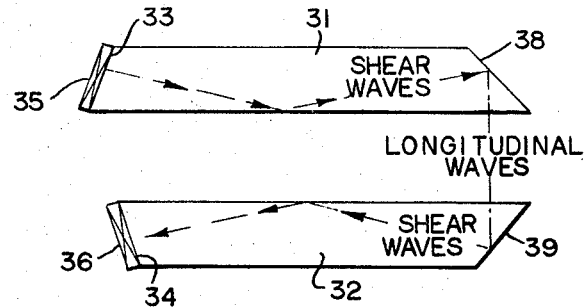
FIG. 3 is an illustration in diagrammatic form of a third embodiment of an ultrasonic measuring system constructed in accordance with the principles of this invention.
Figure 4:
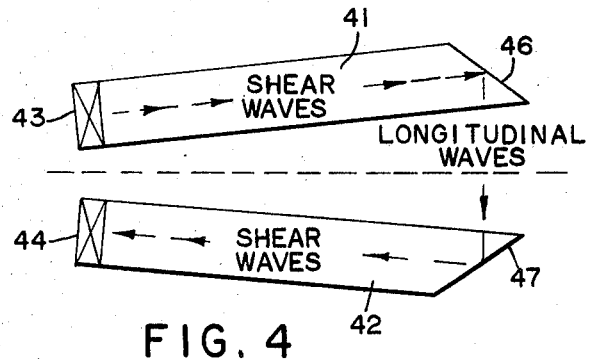
FIG. 4 is an illustration in diagrammatic form of a fourth embodiment of an ultrasonic measuring system constructed in accordance with the principles of this invention.

Many possible probe materials have a $\sigma$ which is not exactly equal to 0.25, but which are nevertheless desirable materials for other reasons. In FIGS. 2, 3, and 4, there are shown three embodiments of ultrasonic measurements systems for use in situations where it is desired to have 100% conversion from the shear to the longitudinal mode, but where Poisson's ratio, $\sigma$, of the buffer rod material is less than 0.26, but not equal to 0.25. The circuitry for excitation of the crystal and for measuring incident shear waves has not been shown. However, as in FIG. 1, suitable conventional circuitry would be connected. In the system illustrated in FIG. 2, a cylindrical buffer rod 11 has a shear wave generating crystal 12 bonded to one end. The opposite end of the probe 11 has a bevelled surface 13, bevelled at an angle such that shear waves propagated parallel to the longitudinal axis of the probe 11 are incident upon the beveled surface at the critical angle for producing complete mode conversion. Since Poisson's ratio, $\sigma$, is not equal to 0.25, then the included angle between the incident and the reflected beam is different from 90°. However, by choosing a probe material whose $\sigma$ is approximately 0.25, this difference is generally in the order of only a few degrees. Since the longitudinal waves produced at the chamfered surface 13 do not strike the side of the probe 11 at normal incidence, there are more internal reflections produced which will give rise to more noise within the probe than would be produced with the system of FIG. 1.

The receiving probe 15 of this system has a bevelled surface 17 at one end, with the angle of bevel selected so that the incoming longitudinal waves are completely mode converted into shear waves. The angle at which the shear waves emerge from the bevelled surface 17 will, of course, depend upon Poisson's ratio, $\sigma$, in the material of the receiving buffer rod 15. The rod may have a length such that shear waves generated at the surface 17 undergo at least one internal reflection before striking the bevelled surface 18 at the other end of the buffer rod 15. A shear wave crystal 20 is bonded to the second bevelled surface 18, and the surface 18 is inclined at an angle such that the shear waves reflected from the side wall are normally incident upon the crystal. The length of the buffer rod 15 may be chosen to include any number of reflections and the angle of the bevel 18 will remain the same, however the bevelled surface 18 must be inclined away from the side wall from which the last reflection of the shear waves took place. It is apparent that the system shown in FIG. 2 cannot be operated efficiently in the pulse echo mode due to internal reverberations tending to interfere with the signal. One advantage of this system, however, lies in the fact that the transmitting probe may be made any arbitrary length since the transmission of the shear waves along the probe does not depend on reflections.

In FIG. 3 there is illustrated another measurement system for use with materials whose $\sigma$ is not exactly 0.25. This system employs a pair of symmetrical probes 31 and 32 respectively. At the crystal end, each of these probes has a bevelled surface 33 and 34 to which are bonded shear wave crystals 35 and 36, respectively. The opposite end of the transmitting probe 31 has a bevelled surface 38 and the opposite end of the receiving probe 32 has a similarly bevelled surface 39. The angle of the bevelled surface 33 and the angle of the bevelled surface 38 are selected so that shear waves emitted along an axis normal to the bevelled surface 33 are reflected from the side wall of the probe 31 and are then incident upon the bevelled surfce 38 at an angle producing 100% mode conversion and a direction of propagation of the converted longitudinal waves which is normal to the longitudinal axis of the probe 31. These longitudinal waves, after passing through the medium to be tested, are then reconverted at the bevelled surface 39 to shear waves, again emitted at an angle such that after one or more reflections they are normally incident upon the shear wave crystal 36. The arrangement shown in FIG. 3 may be operated in the pulse echo mode using only one probe, since the device is entirely symmetrical. It should be noted that the probe shown in FIG. 3 must be carefully controlled in length as well as in the angle of the bevels in order to produce the appropriate angles of incidence of the ultrasonic waves.

Figure 5:
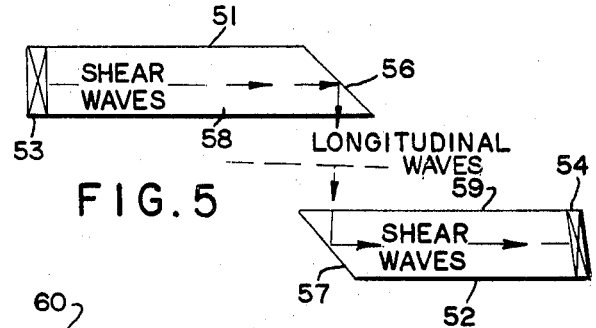
FIG. 5 is an illustration in diagrammatic form of a fifth embodiment of an ultrasonic measuring system constructed in accordance with the principles of this invention.

In FIG. 4 and FIG. 5 there are shown two arrangements of probes where the probes are substantially identical to those shown in FIG. 1 but where the included angle between the incident shear waves and the reflected beam is not equal to 90°. In FIG. 4 the transmitting probe 41 and the receiving probe 42 are identical. Thus each has a crystal, 43 and 44 respectively, bonded to one end for transmitting and receiving, respectively, shear waves parallel to the longitudinal axis. Each of the probes has a bevelled face, 46 and 47 respectively, at the opposite end from the crystal. The probes are arrayed somewhat out of parallel. The ends of the probes which are bevelled are inclined from one another at an angle such that the longitudinal waves reflected from the bevelled surface 46 on probe 41 pass through the material and strike the bevelled surface 47 on probe 42 at an angle of incidence that produces complete conversion to shear waves, which are, in turn propagated directly along the longitudinal axis of probe 42. With this arrangement the simple geometric form of the probes of FIG. 1 may be used (i.e., only one end of each probe need be bevelled), even though the material has a Poisson's ratio, $\sigma$, different from 0.25. The arrangement suffers, however, from the fact that the path length in the test medium between the probes varies across the cross section of the beam of longitudinal waves.

The system of FIG. 5 operates similarly to FIG. 4, but avoids the disadvantage of a varying path length in the test medium. A pair of probes 51 and 52 are formed with crystals 53 and 54 and chamfered surfaces 56 and 57 just as are the probes of FIG. 4. In this arrangement, however, the probes are pointed in opposite directions so that the chamfered surfaces 56 and 57 are parallel to one another and hence if the probes are made of material exhibiting the same Poisson's ratio, $\sigma$, then the beam reflected from the bevelled surface 56 will be incident upon the bevelled surface 57 at precisely the correct angle to produce shear waves propagated parallel with the longitudinal axis of probe 52. Side walls 58 and 59 are parallel and thus the path length in the test medium is constant over the entire beam.

The above discusion has emphasized designs with essentially complete mode conversion, i.e., using materials of $\sigma \leq 0.26$. In the far field, however, there is some beam spread, and the beam may be visualized as confined not to a cylindrical tube but rather to a cone having a half-angle whose sine is $1.22\lambda/d$, where $\lambda$ is the wavelength in the probe, and $d$ is the crystal diameter. Thus, even for cases with small $\lambda/d$ ratios, for example, $\lambda/d=0.1$, the edge of the beam will depart from the beam axis by $\sin^{-1} 0.122$ or 7°. For $\lambda/d=0.01$, the half-angle is 0.7°. When there is beam spread, not all of the beam strikes the bevelled end at the same angle, unless the bevelled end is suitably contoured.

While contouring the bevel offers improvement with respect to overcoming beam spread "de-tuning," at least over a narrow frequency range for a given crystal and buffer rod, additional means may be utilized to suppress unwanted echoes generated by incomplete mode conversions at the bevels. Such means may include the conventional roughening of the side wall surfaces and/or application of attenuating coatings to the side walls. Additionally, one may employ the new filtering approach described next.

Figure 6:
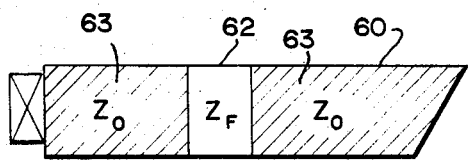
FIG. 6 is an illustration in diagrammatic form of a probe element useful in the practice of this invention.

Spurious longitudinal pulses (at the shear wave frequency) can be filtered out of a shear wave probe if the probe contains a $\lambda_{shear}/2$ thick member of dissimilar acoustic impedance. In FIG. 6 shear wave probe 60 is shown in which the filter member 62 is inserted between sections of the probe material 63. Filtering is best when the filter 62 impedance ($Z_F$) is substantially different from that of the probe material 63 ($Z_0$), and when the filter 62 has a Poisson's ratio=⅓ (i.e., $V_L/V_T=2$). For this special case, the filter 62 passes the shear wave, but blocks the longitudinal wave as follows:

| $Z_F/Z_0$ or $Z_0/Z_F$ | Long. wave energy trans. coex., percent | Long. wave atten., db. |
|---|---|---|
| 1 | 100 | 0 |
| 3 | 36.0 | 4.4 |
| 5 | 14.8 | 8.3 |
| 10 | 3.9 | 14.1 |

This type of filter preferentially passes shear waves of a particular frequency and of a particular propagation direction, usually axial. Thus, spurious echoes generated by incomplete conversion, beam spread or other causes can be suppressed at least to some degree (14.1 db for $Z_F/Z_0$ or $Z_0/Z_F=10$).

Many metals have a $\sigma$ in the range 0.3 to 0.4, and lead, about 0.45. Some plastics, elastomers, gels and heavy greases have a $\sigma$ approaching 0.5, the limiting value exhibited by liquids. The analysis of mode converting probes with $\sigma>0.26$ shows that there are some advantages over the more efficient $\sigma \leq 0.26$ probes. For illustrative purposes it is convenient to discuss one particular case, $\sigma=0.35$, this value being exhibited by several common metals, including aluminum at room temperature (and steel at about 1400° K., depending on the alloy).

If the transmitter probe (for example, FIG. 1) has a $\sigma=0.35$, approximately 50 to 55% of the incident shear wave pressure amplitude is mode converted for $\theta_1$ from about 23° to 27°. In the receiver about 50 to 55% of the incident longitudinal wave pressure amplitude is mode converted for $\theta_3$ from about 54° to 72°. Thus, the angular tolerances on the receiver bevel are not too critical. In fact, the larger $\sigma$ is, the larger the receiver angular tolerance can be, for a given allowable percentage change in mode conversion efficiency. For these angular tolerances, the variation in mode converted energy is about ±2% in transmitter and receiver.

By way of contrast, in a nominally 100% efficient (with respect to mode conversion) transmitter and receiver both having a $\sigma$ of 0.14, angular deviations of ±2° and ±9°, respectively, from the optimum (27.16° and 44.8°, respectively) lead to mode converted energy fluctuations of only about ±1% in the transmitter but about ±8% in the receiver.

Thus, it can be seen that a receiver probe of $\sigma$ greater than 0.26 (e.g., 0.35), while not as efficient a mode converter as a probe of $\sigma \leq 0.26$ (e.g., 0.14), can offer the advantage of being less sensitive to angular misalignment. That is to say, as the angle of incidence varies from the optimum the received amplitude in the $\sigma=0.35$ receiver may be more nearly constant, whereas in the $\sigma=0.14$ receiver the received amplitude may be relatively more fluctuating.

Another advantage of $\sigma \geq 0.26$ probes over $\sigma \leq 0.26$ probes lies in the more favorable impedance values that may sometimes be exploited. Thus, comparing probes of aluminum ($\sigma \approx 0.35$) and alumina ($\sigma \approx 0.25$), the alumina can clearly be the more efficient mode converter (essentially 100% efficiency possible), while aluminum can at best be about 79% efficient in transmitter and receiver, or overall, about 62% efficient. This represents about a 2 db advantage of alumina over aluminum. Alumina, however, has a characteristic acoustic impedance over twice that of aluminum. Thus if the probes are being used to transmit a pulse through a gas, due to acoustic impedance mismatches at the transmitter/air and receiver/air interfaces, the aluminum probes will show a gain of over 7 db in transmission efficiency compared to the alumina probes, more than overcoming the 2 db deficit attributable to relatively poorer conversion efficiency in aluminum. The aluminum probes would also be less expensive, and less brittle, than the alumina ones.

From the above analysis and examples, it is apparent that mode converting probes cannot be judged solely on the basis of mode conversion efficiency. Consequently, while probes having $\sigma \leq 0.26$ can be the most efficient mode converters, they are not always the preferred choice.

Continuing this analysis of the $\sigma>0.26$ probe (e.g., aluminum of $\sigma=0.35$), in the probe of FIG. 1 the requirement that $\theta_1+\theta_2=90°$ and $\theta_3+\theta_4=90°$ may be imposed rather than maximizing the mode conversion efficiency. These angles depend on the velocity ratio $V_T/V_L$, and therefore depend on Poisson's ratio, as is seen from Snell's Law:

$$\frac{V_T}{\sin \theta_1} = \frac{V_L}{\sin \theta_2} = \frac{V_L}{\sin \theta_3} = \frac{V_T}{\sin \theta_4}$$

or $$\frac{\sin \theta_1}{\sin \theta_2} = \frac{\sin \theta_4}{\sin \theta_3} = \frac{V_T}{V_L} = \sqrt{\frac{1-2\sigma}{2(1-\sigma)}}$$

Thus, each $\sigma$ determines two complementary angles $\theta_1$ and $\theta_2$. When $\sigma=0.25$, $\theta_1=30°$, $\theta_2=60°$ and the mode conversion efficiency is 100%. When $\sigma \neq 0.25$, $\theta_1+\theta_2$ can still=90°, but the efficiency is less than 100%. For example, if $\sigma=0.35$, $\theta_1 \approx 25°$ and $\theta_2 \approx 65°$ and the mode conversion efficiency is about 75%. In the receiver, $\theta_3 \approx 65°$ and $\theta_4 \approx 25°$ and the efficiency is again about 75%.

In other words, FIG. 1 is doubly optimized when $\sigma=0.25$ (orthogonality and efficiency) whereas when $\sigma \neq 0.25$, it is only singly optimized (orthogonality) at the expense of mode conversion efficiency.

While the invention has been described in terms of shear waves vibrating in a vertical direction and bevelled surfaces inclined in that same direction, it is apparent that the shear wave source may be oriented to produce shear waves vibrating in any direction, providing only that the bevelled surface is inclined in the same direction, or inclined so that a sufficient component of the shear wave vibration is perpendicular to it (i.e., the SV component).

The invention having been described, various modifications may occur to those skilled in the art, and the invention described herein should be construed as limited only by the spirit and scope of the appended claims.

What is claimed is:

1. A measurement system for determining the ultrasonic transmission characteristics of a fluid material which presents a hostile environment to ultrasonic transducing sources comprising, an ultrasonic transducing source emitting ultrasonic shear waves at a predetermined wave length along an axis of propagation normal to the face of said source; an elongated solid buffer rod formed such that its length exceeds three times its diameter, said length being greater than ten of said wave length, to isolate said source from the hostile environment of said fluid, said buffer rod having a first end bonded to said ultrasonic source and a second end bevelled to convert shear waves propagated along said rod from said source into ultrasonic longitudinal waves having an axis of propagation substantially perpendicular to the longitudinal axis of said buffer rod and directed from a surface of said rod into said fluid material, and means for detecting longitudinal ultrasonic waves emitted from said buffer rod and transmitted through said material.

2. An ultrasonic measurement system in accordance with claim 1 wherein the Poisson's ratio of the material of said buffer rod is no greater than 0.26 and wherein said second end is bevelled at an angle such that said propagated shear waves are substantially completely mode converted into longitudinal waves.

3. An ultrasonic measurement system in accordance with claim 1 wherein the Poisson's ratio of the material from which said elongated buffer rod is formed equals 0.25 and wherein said second end is bevelled at an angle of 60° with respect to the longitudinal axis of said elongated buffer rod.

4. An ultrasonic measurement system in accordance with claim 3 wherein said means for detecting longitudinal waves comprise a second elongated buffer rod identical with the first buffer rod and wherein the first end of said second buffer rod is bonded to a crystal providing output electrical signals in response to incident shear waves and further wherein said first buffer rod and said second buffer rod are positioned with respect to one another so that longitudinal waves emitted from said material are incident upon said bevelled surface of said second buffer rod at an angle of 60° with respect to a normal to said bevelled surface.

5. An ultrasonic measurement system in accordance with claim 2 wherein said first end of said buffer rod is bevelled at a first angle and said second end of said buffer rod is bevelled at a second angle, the angle of bevel of said first end being such that shear waves emitted along an axis of propagation normal to the face of said bevel are reflected from the side of said buffer rod and are incident upon the bevelled face of said second end of said buffer rod at an angle which results in substantially complete conversion of said shear waves into ultrasonic longitudinal waves, the bevelled face of said second end of said buffer rod being inclined at an angle such that the longitudinal waves generated by said conversion are emitted from said buffer rod along an axis perpendicular to the longitudinal axis of said buffer rod.

6. An ultrasonic measurement system in accordance with claim 5 and further including a second buffer rod substantially identical to said first buffer rod and disposed with respect to said first buffer rod such that longitudinal waves emitted from said first buffer rod pass through said material and are incident upon the bevelled surface of said second end of said second buffer rod at an angle to produce substantially complete conversion of said longitudinal waves to shear waves at said surface, such shear waves being emitted from said surface along an axis of propagation such that they are received at said first bevelled surface of said buffer rod in a direction normal to the plane of said first bevelled surface.

7. An ultrasonic measurement system in accordance with claim 2 and further including a second buffer rod substantially identical to said first buffer rod and including a crystal bonded to the first end of said second buffer rod, said crystal producing electrical signals in response to shear waves incident thereon, said first buffer rod and said second buffer rod being disposed with respect to one another so that a portion of the longitudinal waves emitted from the bevelled surface of said second end of said first buffer rod are transmitted through said material and are incident upon the bevelled surface of said second end of said second buffer rod at an angle to produce substantially complete conversion of said longitudinal waves to shear waves, said shear waves being emitted from said bevelled surface in a direction such that they strike said shear wave crystal at normal incidence.

8. A measurement system in accordance with claim 1 wherein said buffer rod includes a first longitudinal section formed of a first material and a second longitudinal section formed of a different material having an acoustic characteristic impedance substantially different from that of said first material which relatively suppresses longitudinal waves and relatively suppresses shear waves which are propagated other than along the longitudinal axis of said buffer rod, the length of said second longitudinal section has a length substantially equal to ½ said predetermined shear wave length.

9. A measurement system in accordance with claim 8 wherein the ultrasonic impedance of said first section differs from the ultrasonic impedance of said second section by more than a factor of three.

10. An ultrasonic transmission probe for use in testing a fluid material which presents a hostile environment to ultrasonic transducing sources comprising, a shear wave source for emitting ultrasonic shear waves vibrating in a first direction and characterized by a predetermined wave length along an axis of propagation normal to the face of said source;

a generally cylindrical elongated buffer rod having a length greater than ten of said wave lengths to isolate said source from the hostile environment of said fluid said buffer rod having a first end bonded to said shear wave source such that the longitudinal axis of said buffer rod is normal to the face of said source, said buffer rod having a bevelled surface at its second end, the plane of said bevelled surface an angle of inclination with respect to the longitudinal axis of said buffer rod such that shear waves emitted from said shear wave source and incident upon said bevelled surface are substantially completely converted to longitudinal waves, the plane of said bevelled surface being perpendicular to the plane defined by the longitudinal axis of said buffer rod and the polarization vector of said vibrations, said buffer rod being formed of a material characterized by a Poisson's ratio no greater than 0.26, the angle of said bevelled surface being such that said longitudinal waves are emitted from said rod substantially perpendicular to the longitudinal axis of said rod.

References Cited
UNITED STATES PATENTS

| | | | |
|---|---|---|---|
| 2,527,986 | 10/1950 | Carlin | 73—67 |
| 2,592,135 | 4/1952 | Firestone | 73—67 |
| 2,624,804 | 1/1953 | Arenberg | 178—44 |
| 2,957,142 | 10/1960 | May | 333—30 |
| 3,302,044 | 1/1967 | Lynnworth et al. | 310—8.3 |
| 3,302,453 | 2/1967 | Wood et al. | 73—67.7 |

OTHER REFERENCES

Nondestructive Testing Handbook, vol II, edited by R. C. McMaster, 1959, Ronald Press Co. pp. 43–17 and 43–18.

RICHARD C. QUEISSER, Primary Examiner

V. J. TOTH, Assistant Examiner

U.S. Cl. X.R.

73—67.6

FO-1050
(5/69)

UNITED STATES PATENT OFFICE
CERTIFICATE OF CORRECTION

Patent No. 3,477,278      Dated November 11, 1969

Inventor(s) L. C. Lynnworth

It is certified that error appears in the above-identified patent and that said Letters Patent are hereby corrected as shown below:

Column 10, line 65 before "an" insert --having--

SIGNED AND SEALED
APR 28 1970

(SEAL)
Attest:

Edward M. Fletcher, Jr.
Attesting Officer

WILLIAM E. SCHUYLER, JR.
Commissioner of Patents